United States Patent [19]

Ueno et al.

[11] Patent Number: 4,653,039

[45] Date of Patent: Mar. 24, 1987

[54] DISC PLAYER

[75] Inventors: Masahiro Ueno, Tokyo; Takashi Naito, Kanagawa, both of Japan

[73] Assignee: Sony Corporation, Tokyo, Japan

[21] Appl. No.: 689,598

[22] Filed: Jan. 8, 1985

[30] Foreign Application Priority Data

Jan. 13, 1984 [JP] Japan .................................. 59-5383

[51] Int. Cl.$^4$ ............................................. G11B 17/04
[52] U.S. Cl. .................................... 369/75.2; 369/77.1
[58] Field of Search ...................... 369/75.2, 77.1, 77.2

[56] References Cited

FOREIGN PATENT DOCUMENTS

| | | | |
|---|---|---|---|
| 26152 | 4/1981 | European Pat. Off. ............ | 369/75.2 |
| 56-58167 | 5/1981 | Japan ................................... | 369/75.2 |
| 0166559 | 10/1983 | Japan ................................... | 369/77.1 |
| 2126003 | 3/1984 | United Kingdom ............... | 369/77.1 |

*Primary Examiner*—Steven L. Stephan
*Attorney, Agent, or Firm*—Hill, Van Santen, Steadman & Simpson

[57] ABSTRACT

In a disc player comprising a disc tray on which a disc is horizontally placed, a player body which has a front opening, and a turn table which is provided in the player body, the disc tray being drawn horizontally into the player body through the front opening and then moved downwardly in the horizontal state so that the disc may be mounted horizontally on the turn table, the disc player is so constructed as to be able to move the disc tray downwardly in the horizontal state, just before the disc tray fully drawn from the player body through the front opening.

5 Claims, 21 Drawing Figures

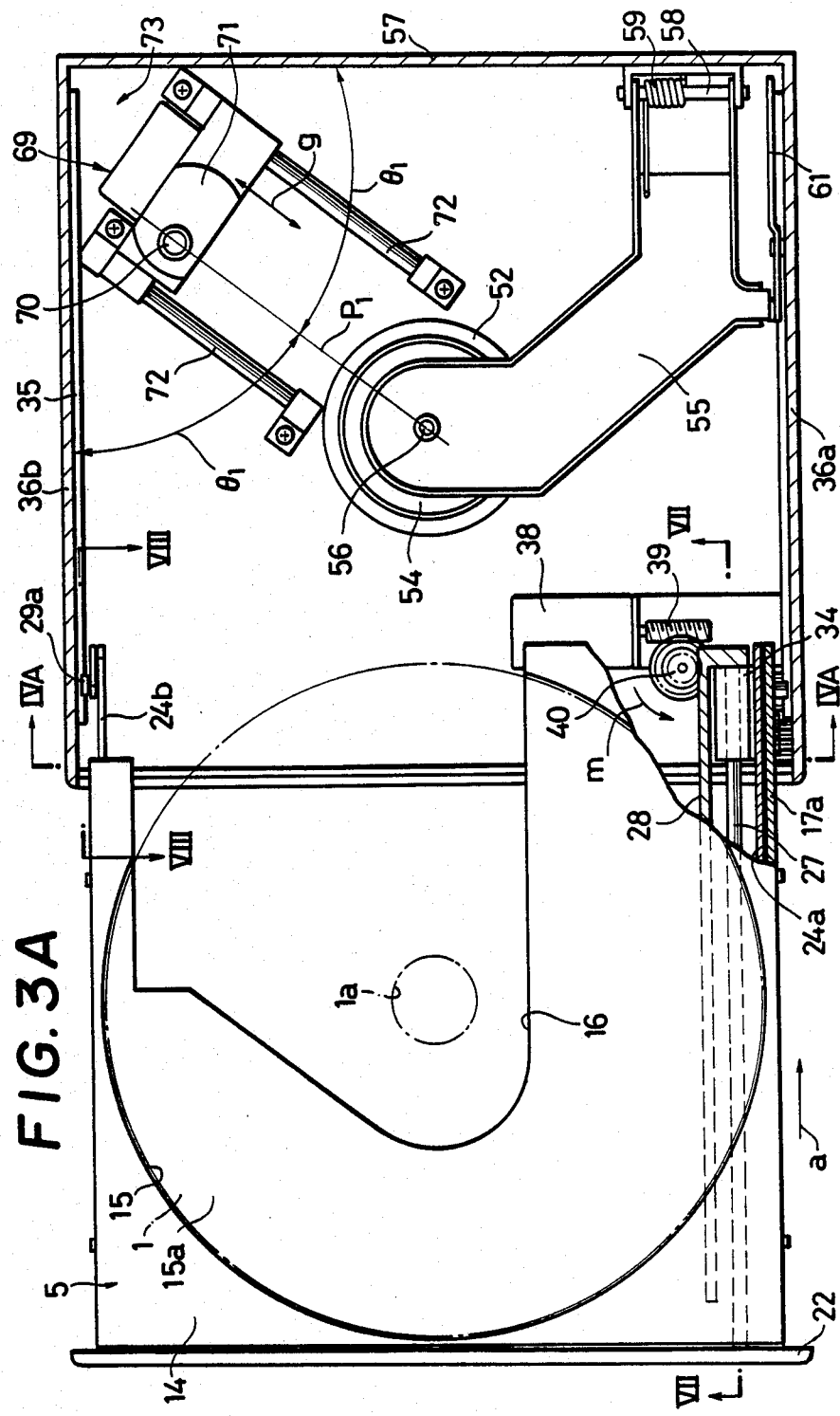

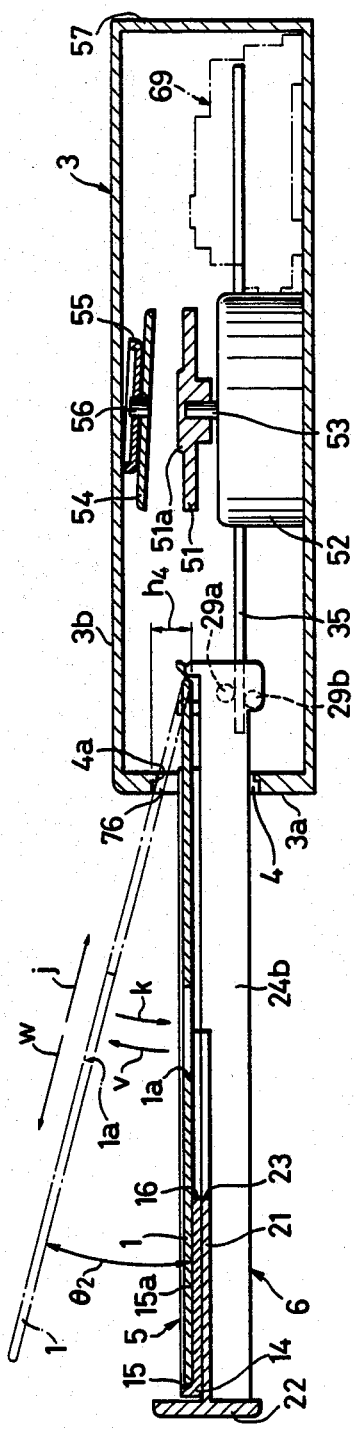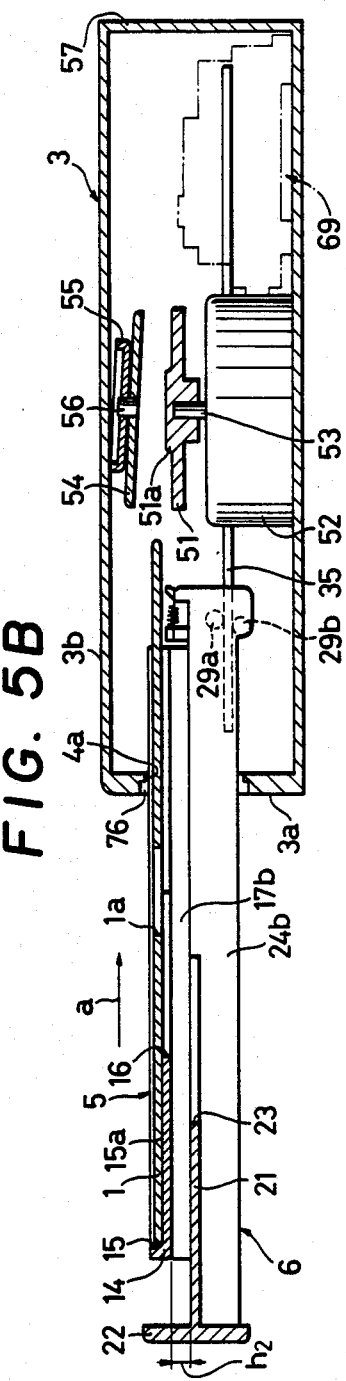

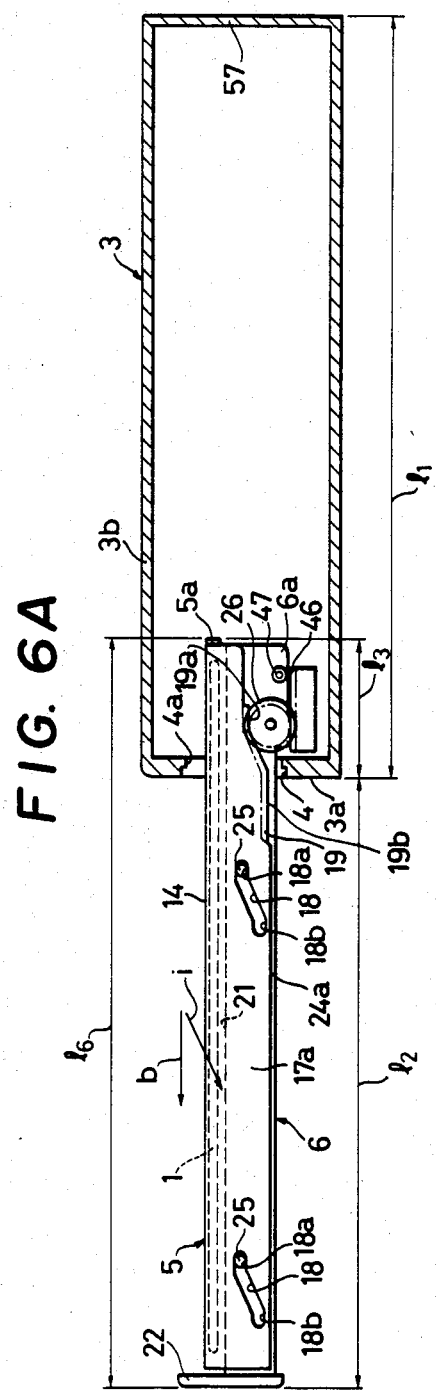
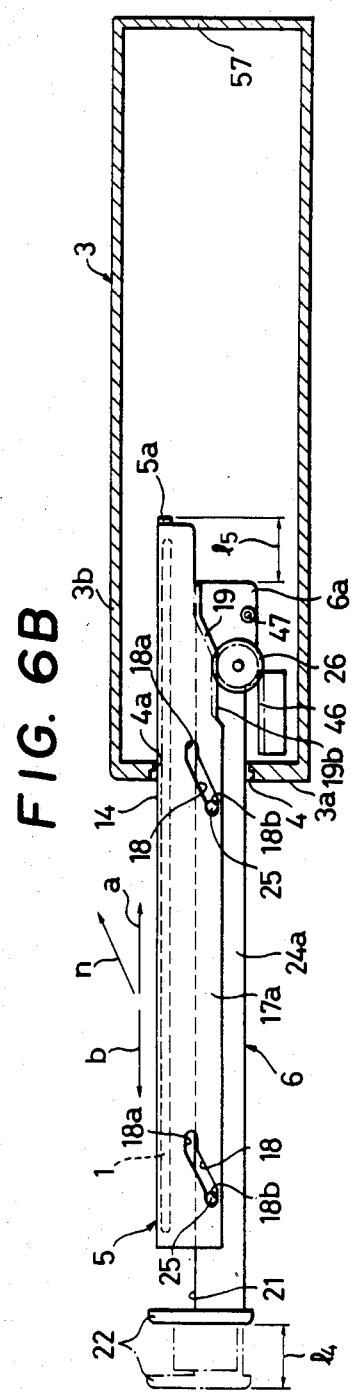

FIG. IOA
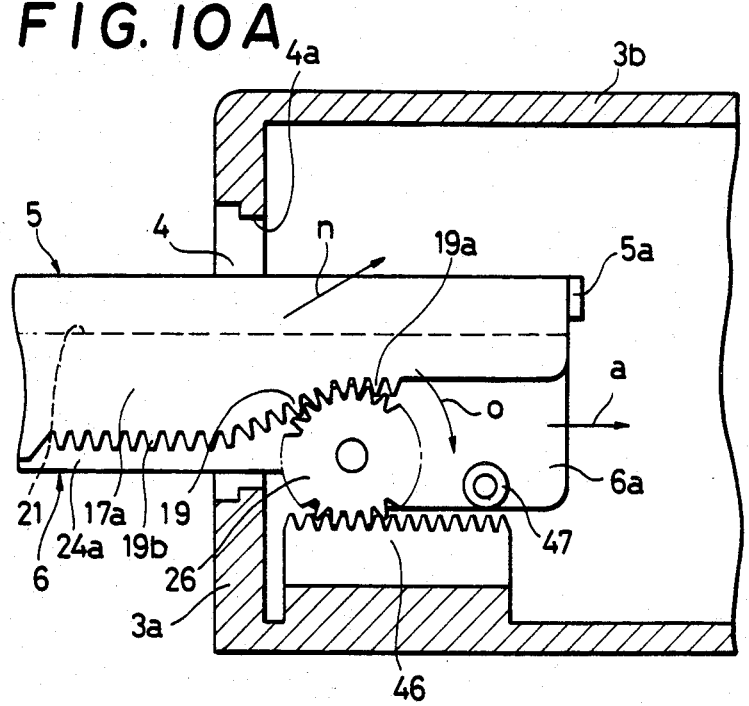
FIG. IOB
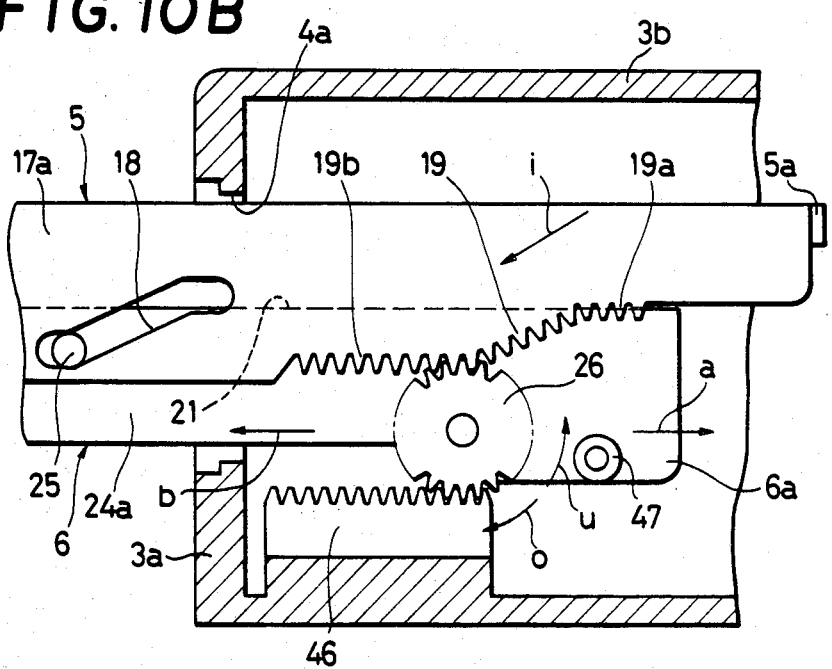

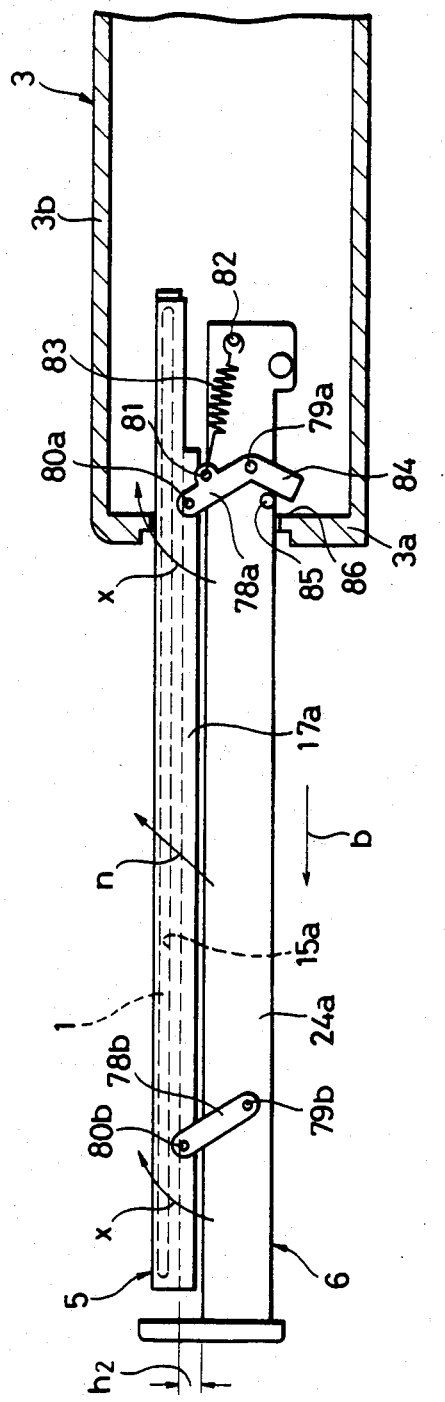

DISC PLAYER

BACKGROUND OF THE INVENTION

1. Field of the Invention

This invention relates generally to a disc player, and is particularly suitable for a compact disc player, wherein a disc tray on which a disc is horizontally set, is drawn horizontally into a player body through its front opening and due to a parallel downward displacement of the disc tray, the disc can be mounted horizontally on a turn table.

2. Description of the Prior Art

As everybody knows, a compact disc used for a compact disc player makes a long reproducing performance possible, despite its very small diameter of 12 cm.

Hence, the compact disc player is suitable for outdoor use or for a car, so that recently effort has occurred to make the compact disc player thinner and smaller in size. Thus, the following problems arise with compact disc players of this sort, wherein the player is formed so as to draw the disc tray, on which the compact disc is set, horizontally into the player body.

As the longitudinal length of the player body becomes smaller, the distance that the disc tray is moved from the player body through the front opening is restricted, so that it becomes impossible to expose the compact disc on the disc tray completely out of the player body and a part of the compact disc remains in the player body, even when the disc tray is drawn out from the player body.

Secondly, as the height of the player body becomes smaller, the height of the front opening is restricted, so that a gap between the disc on the disc tray and the upper edge of the front opening of the player body becomes very small. Thus, when the compact disc is set horizontally on the disc tray before being loaded, or when the compact disc is removed from the disc tray after being ejected, a part of the compact disc must be obliquely drawn into or from the player body through the above-mentioned extremely narrow gap, and this makes the loading or ejecting operation difficult.

To draw the compact disc obliquely into or from the player body requires care, because there is a fear that the compact disc will be damaged, if the compact disc is rubbed against the upper edge of the front opening or the disc tray during the above operation.

OBJECTS AND SUMMARY OF THE INVENTION

Accordingly, it is an object of the present invention to provide a disc player, for a disc which can be removed or placed on a disc tray very easily, even though the disc player is very thin and much smaller in size. It is accomplished by providing a mechanism so as to cause a parallel downward displacement to the disc tray, just before the disc tray is drawn from a player body through its front opening.

A further object of the invention is to provide a disc player, wherein the longitudinal length of a player body can be made very small, and also making it possible to draw a disc tray fully from the player body. It is accomplished by a tray carrier capable of being drawn horizontally into or from the player body through its front opening and with a mechanism so as to cause up-and-down movement to the disc tray, which is supported on the tray carrier so as to make a parallel slant displacement of the disc tray possible, as the tray carrier is moved.

A furthermore object of the invention is to provide a disc player, wherein a mechanism to cause a parallel slant downward displacement to a disc tray in relation to a tray carrier just before the disc tray is drawn from a player body by the tray carrier is very simple and acts very smoothly. It is accomplished by a mechanism which comprises a pinion supported rotatably on the tray carrier, a first rack formed on a slant in the disc tray and in mesh with this pinion, and a second rack so arranged as to engage and mesh with the pinion just before the disc tray is fully drawn from the player body through its front opening.

Another object of the invention is to provide a disc player, as mentioned in the object before the preceding one, in which the mechanism to cause parallel on a slant downward displacement to the disc tray in relation to the tray carrier is utilized, in order that a horizontal mounting of the disc on a turn table can be performed smoothly and surely. It is accomplished by a means so as to cause a parallel downward displacement to the disc tray by using a mechanism by which the tray carrier can be drawn against the force of a spring, which urges the disc tray in a direction for drawing it into the player body and simultaneously lifting it upwardly, and at the later stage of its movement it is horizontally drawn into the player body through its front opening, though the disc tray is stopped at this stage.

Still another object of the invention is to provide a disc player, wherein the number of parts and assembly processes can be reduced. It is accomplished by molding a disc tray from synthetic resin or the like so as to form integrally a first rack in a side plate of the disc tray.

BRIEF DESCRIPTION OF THE DRAWINGS

FIG. 3A is a plan view, partly broken away and in section, of the disc player of FIG. 1, wherein the tray carrier is drawn from a player body;

FIGS. 5A to 5D are respective sectional views of the disc player of FIG. 1 for explaining loading and ejecting operations of a disc;

FIGS. 6A to 6D are respective sectional views of the disc player corresponding to FIGS. 5A to 5D, for explaining the movements of the disc tray and tray carrier;

FIGS. 10A and 10B are respective enlarged detail views which illustrate aslant upward movements of the disc tray relative to the tray carrier; and FIGS. 11A and 11B are respective sectional views of a disc player with the other loading-ejecting mechanism for the disc according to the other embodiment of this invention.

DETAILED DESCRIPTION OF A PREFERRED EMBODIMENTS

Figure 1:
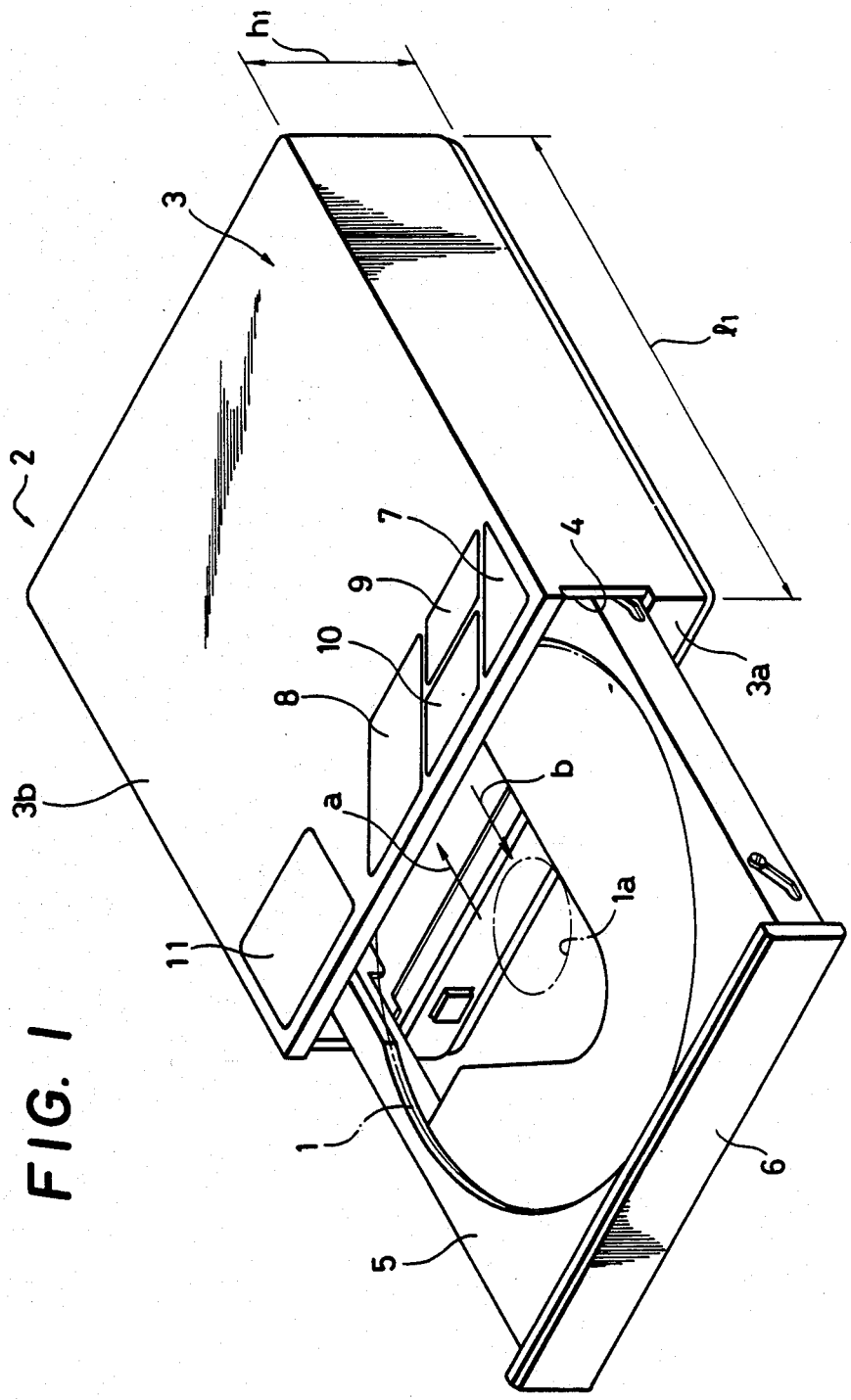
FIG. 1 is a perspective view of a disc player according to an embodiment of this invention.

Referring to the drawings in detail, and initially to FIG. 1 thereof, it will be seen that a disc player 2 embodying the present invention is intended to accomodate a compact disc 1 (which is designated only as a disc hereinafter). The diameter of this disc 1 is 12 cm is known and a player body 3 of the disc player 2 is intended to be made to a degree thinner in thickness and smaller in size; and its longitudinal length $l_1$ is about 13 cm and its height $h_1$ is about 4 cm.

Formed in a front wall 3a of the player body 3 is a front opening 4, and to make it possible to load horizontally the disc 1 in the player body 3, a disc tray 5 and a tray carrier 6 are drawn horizontally and freely from and into the player body 3 through the front opening 4 as shown by arrows a and b.

Disposed on the front of a top wall 3b of the player body 3 are several low force changeable switches for loading-ejecting 7, reproducing-pause 8, fast forwarding 9 and quick returning 10, and a panel 11 for displaying time, mode, address of the music to be played, etc.

When the loading-ejecting switch is actuated for loading after the disc 1 is set horizontally on the disc tray 5, the disc tray 5 is loaded horizontally into the player body 3 through the front opening 6 by the tray carrier 6. Thereafter if the reproducing-pause switch 8 is actuated for reproducing, reproducing of the disc 1 is performed, but in succession to that, if the fast forwarding switch 9 is closed, the disc 1 is fast forwarded to play a selected musical number, and similarly in succession to that, if the quick returning switch 10 is closed, the disc 1 is returned quickly to play a selected musical number. After reproducing has been performed, if the loading-ejecting switch 7 is actuated for ejecting, the disc tray 5 is ejected horizontally from the player body 3 by the tray carrier 6 through the front opening 4.

Now, an embodiment of a loading-ejecting mechanism, etc. of the disc 1 is described on the basis of FIGS. 2 to 10B.

Figure 2:
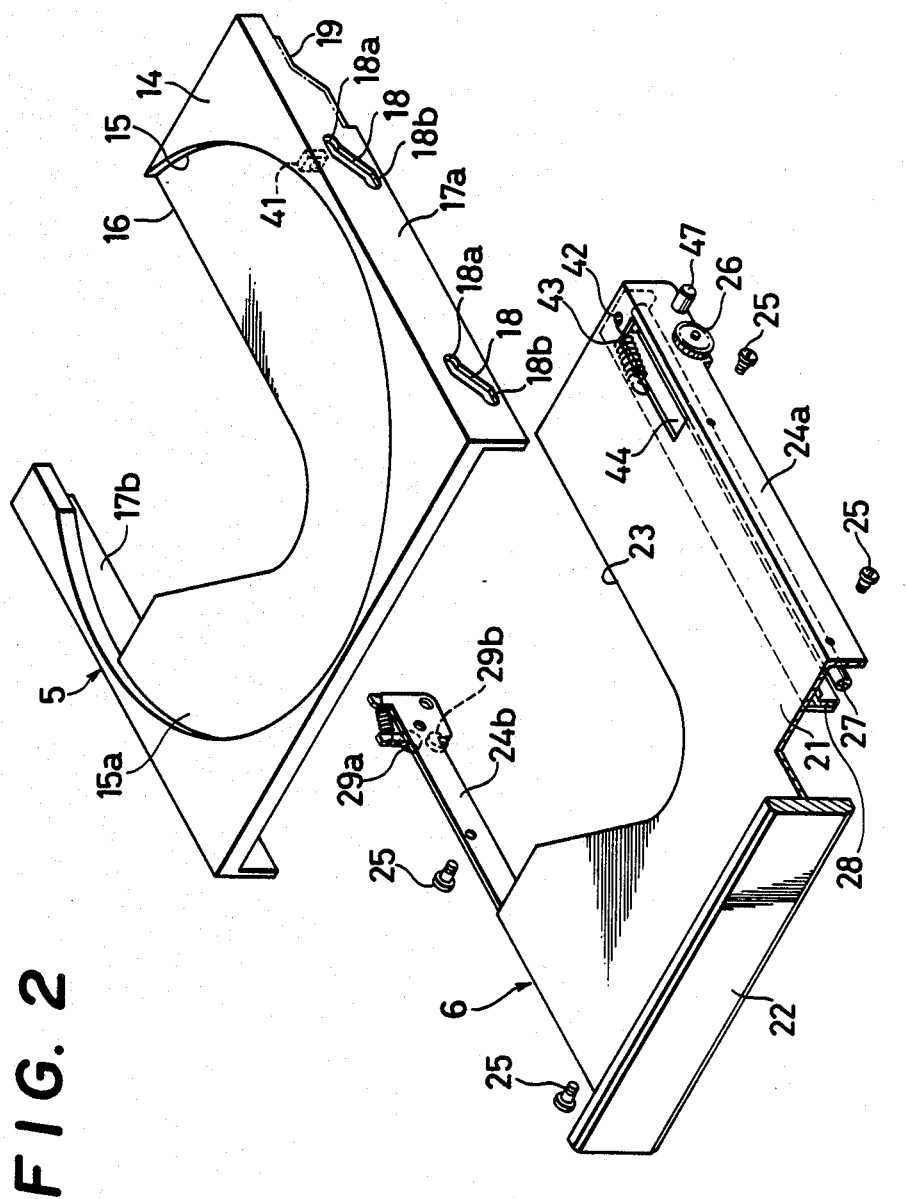
FIG. 2 is an exploded, perspective view, partly broken away and in section, of a tray carrier with a disc tray of FIG. 1.
Figure 4A:
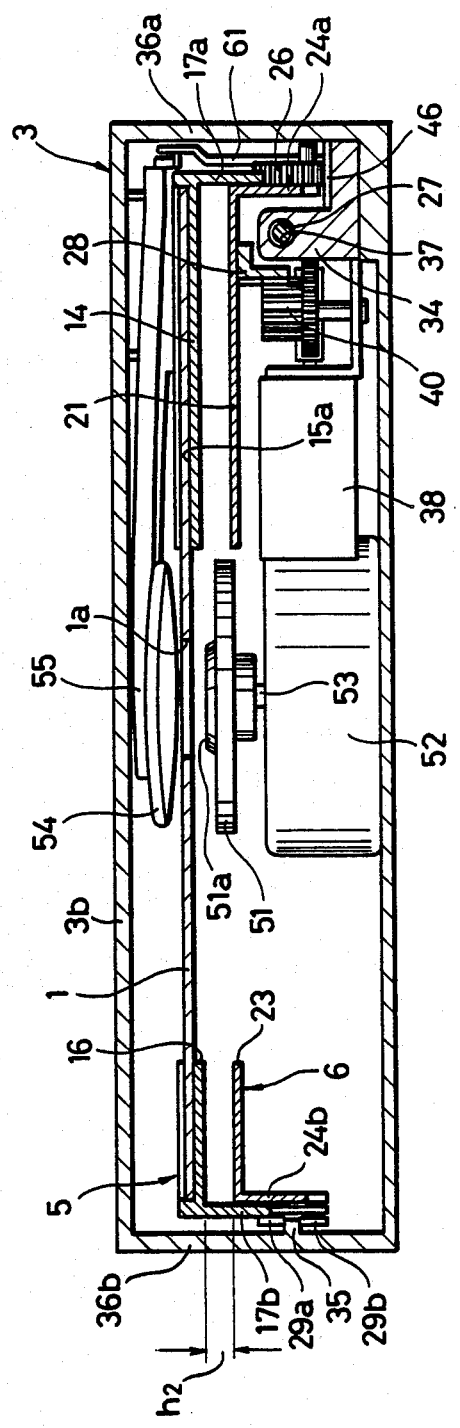
FIG. 4A is a sectional view taken along the line IVA—IVA on FIG. 3A.
Figure 4B:
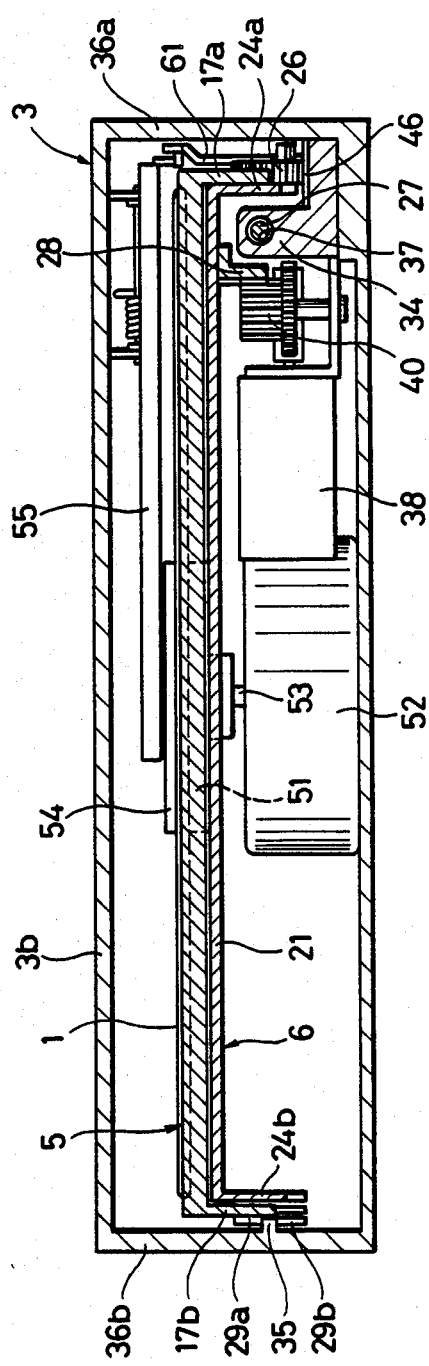
FIG. 4B is a sectional view taken along the line IVB—IVB on FIG. 3B.

As illustrated in FIG. 2, formed on the horizontal plate 14 of the disc tray 5 is a circular recess 15 for positioning the disc 1 horizontally, and a cutout 16 is provided in a portion of the recess 15 from its center to one side of its rear. This disc tray 5 has an almost channel-shaped section as illustrated in FIGS. 4A, 4B, and a plurality of inclined slots 18 each of which have the same ascent relative to each other toward the rear, and are disposed in respective front and rear portions of each of right and left side plates 17a, 17b which extend vertically downward from the horizontal plate 14.

Formed integrally in the end portion of one of the side plate 17a is an inclined rack 19 which has the same inclined angle as the inclined slot 18.

This disc tray 5 is molded integraly from synthetic resin, and if necessary, reinforced with a metal plate or the like. Thereby, the inclined rack 19 can be formed very easily.

Next, as shown in FIG. 2, on the front of a horizontal plate 21 of the tray carrier 6, there is formed integrally and vertically a lid 22 for covering the front opening 4 of the player body 3, and a cutout 23 is provided in a position corresponding to the cutout 16 of the disc tray 5.

This tray carrier 6 has also an almost channel-shaped section as illustrated in FIGS. 4A, 4B, and a pair of guide pins 25 are fixed to respective front and rear portions of each of right and left side plates 24a, 24b which extend vertically downward from the horizontally plate 21.

In the rear portion of one of the side plates 24a, there is rotatably arranged a pinion 26, and under the horizontal plate 21 and adjacent to one of the side plates 24a, there are disposed a horizontal guide shaft 27 and a horizontal rack 28 which extends along the side plates 24a, 24b.

Figure 8:
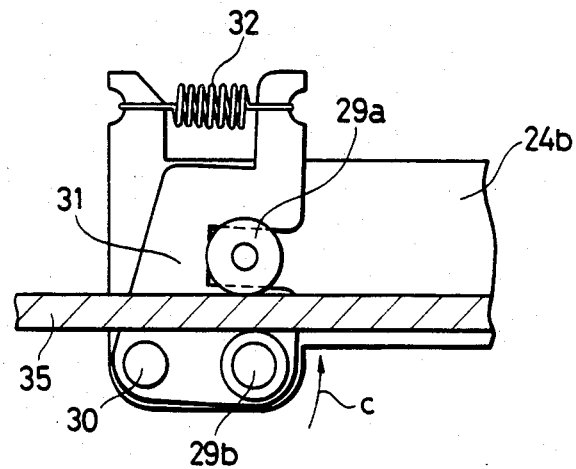
FIG. 8 is a sectional view, on an enlarged scale, taken along the line VIII—VIII on FIG. 3A.

Disposed rotatably in the rear portion of the other of the side plates 24b are a pair of upper and lower guide rollers 29a, 29b as shown in FIG. 8. The lower guide roller 29b is rotatably mounted in a swing plate 31 which is able to turn on a pin 30 and urged in the direction of arrow c by a spring 32.

Next, as shown in FIGS. 3A to 6D, the disc tray 5 is stacked horizontally on the tray carrier 6, the four guide pins 25 engage with the respective inclined slots 18, and the upper side of the pinion 26 engages with the inclined rack 19.

On the other hand, the tray carrier 6 is supported horizontally by a horizontal bearing 37 and a horizontal guide rail 35 both disposed in the player body 3.

That is, as shown in FIGS. 3A to 4B and FIG. 7, a bearing block 34 is disposed adjacent to the front opening 4 and to the inside of the side wall 36a which is one of the two side walls 36a, 36b of the player body 3, and the horizontal guide shaft 27 is loosely fitted in the bearing 37 which is provided horizontally through this bearing block 34.

The horizontal guide rail 35 is so formed integrally with the other side wall 36b as to protrude from its inside face, and the upper and lower guide rollers 29a, 29b are in contact with the upper and lower faces of this horizontal guide rail 35, respectively.

Hence, the tray carrier 6 on which the disc tray 5 is stacked can be moved horizontally due to guiding of the horizontal guide shaft 27 and horizontal guide rail 35. On this occasion, as shown in FIG. 8, the horizontal guide rail 35 is sandwiched in between the upper and lower guide rollers 29a, 29b and pressed elastically by force of the spring 32, so that the tray carrier 6 is restrained from shaking against the horizontal guide rail 35, and moves horizontally and smoothly on the horizontal guide rail 35.

Next, as shown in FIGS. 3A to 4B, arranged in the player body 3 are a motor 38 and a pinion 40 which is driven by the motor 38 through a reduction mechanism, i.e. a worm gear 39, and this pinion 40 engages with the horizontal rack 28 of the tray carrier 6, so that the tray carrier 6 can be moved horizontally forward or backward due to forward or reverse rotation of the motor 38.

Figure 7:
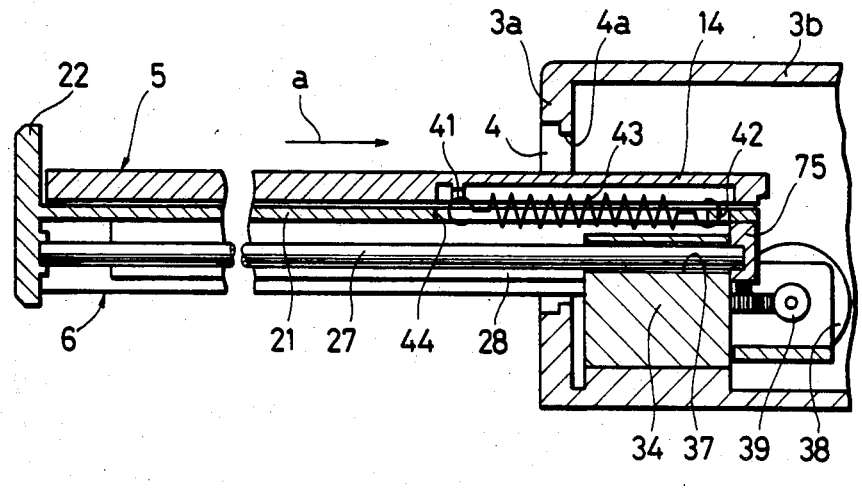
FIG. 7 is a sectional view taken along the line VII—VII on FIG. 3A.

As illustrated in FIGS. 2 and 7, both end hooks of a spring 43 engages respectively with eyes 41, 42 which are disposed in the respective horizontal plates 14, 21 of the disc tray 5 and tray carrier 6. Thereby, the tension spring 43 urges the disc tray 5 toward the rear side of the tray carrier 6 and in the longitudinal direction of the disc player 2 as shown by arrow a in FIG. 7. This tension spring 43 is put in an elongated opening 44 which is provided in the horizontal plate 21 of the tray carrier 6.

As illustrated in FIG. 6A, a horizontal rack 46 is disposed in the player body 3, and just before the tray carrier 6 is drawn horizontally out of the player body 3 through the front opening 4 and stopped, the pinion 26 engages at its bottom side with this horizontal rack 46 and is rotated. The horizontal rack 46 is short in length and formed integrally at one side of the bearing block 34 in the longitudinal direction of the disc player 2 as shown in FIGS. 4A and 4B.

Figure 6C:
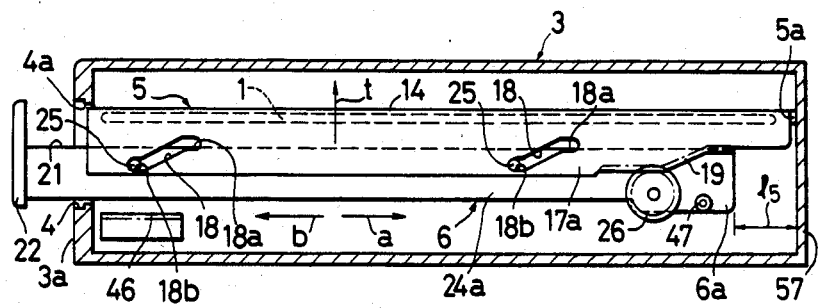
Figure 6D:
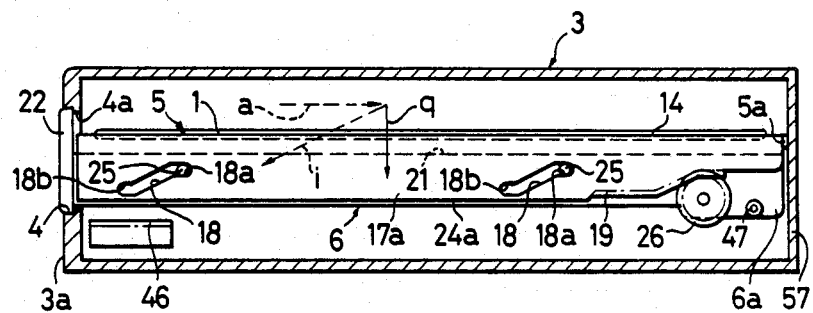

Further, as shown in FIG. 6D, a pin 47 is arranged in the rear part of one of the side plates 24a of the tray carrier 6 so as to cause a clamper, which is described later, to be drived downward, just before the tray carrier 6 is drawn horizontally into the player body 3 and stopped.

Next, as shown in FIGS. 5A to 5D, a turn table 51 is arranged horizontally at the center of the player body 3. This turn table 51 is mounted on the top of a motor shaft 53 of a drive motor 52 and turned horizontally by this drive motor 52. Over the turn table 51, there is arranged a clamper 54 which can be moved upwardly and downwardly. This clamper 54 is suspended rotatably from a lifting arm 55 at its free end side through a suspension rod 56 as illustrated in FIGS. 3A, 3B and 9.

On the other hand, a control plate 61 pivots in the upward and downward directions on a pin 60 which protrudes from the inside face of one of the side walls 36a of the player body 3, and a projection 63 formed integrally with the lifting arm 55 is put on a projection 62 formed integrally with an upper end 61a of the control plate 61.

Figure 9:
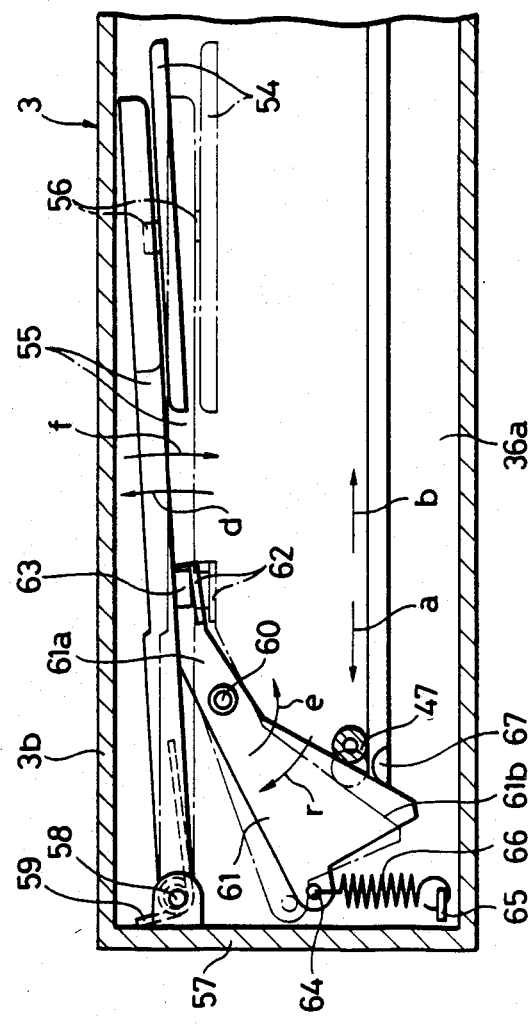
FIG. 9 is an elevational view of an up-and-down mechanism of a clamper for explaining its performance.

A spring 66 is nearly vertically provided between eyes 64, 65 which are respectively disposed in a lower end 61b of the control plate 61 and the rear wall 57 of the player body 3, and by force of this spring 66, the control plate 61 is urged rotatably in direction of arrow e as shown in FIG. 9, so that the lifting arm 55 is urged upwardly (in direction of arrow d) as shown in FIG. 9 through the projections 62, 63.

Figure 3B:
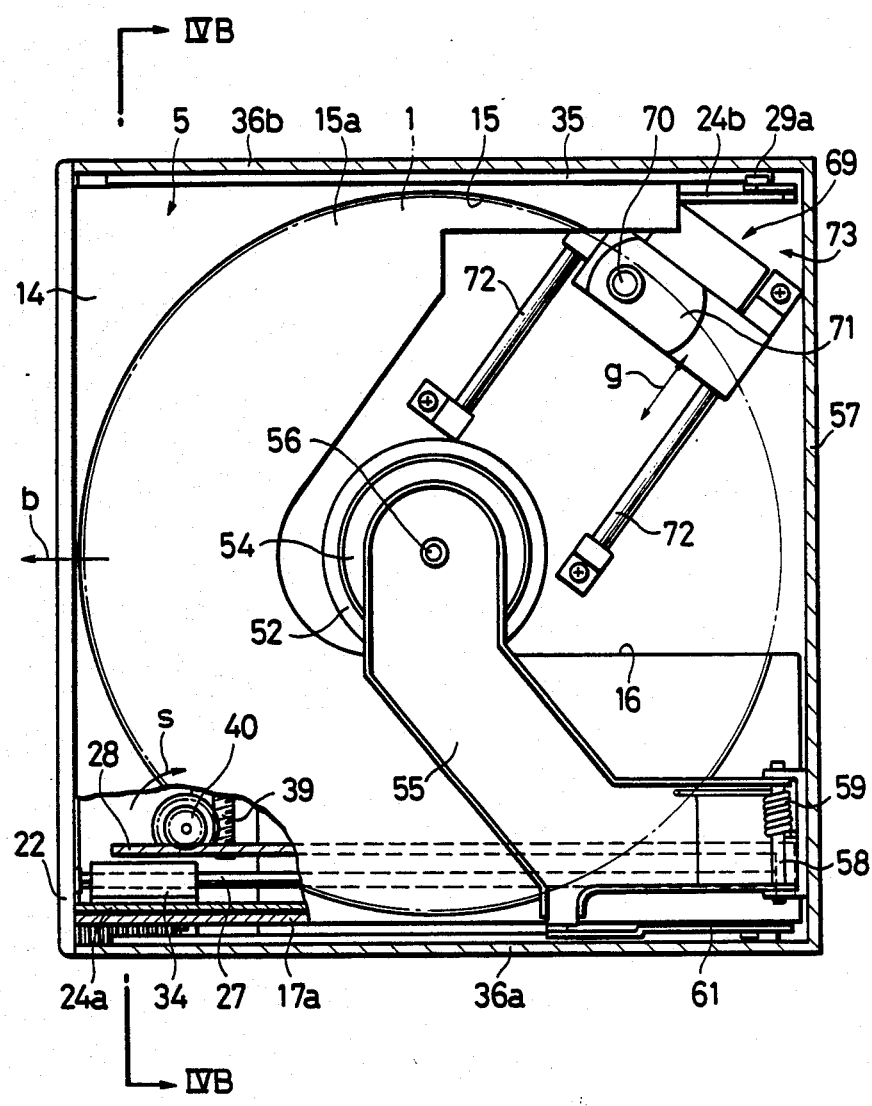
FIG. 3B is a plan view, partly broken away and in secition, of the disc player of FIG. 1, wherein the tray carrier is drawn into the play body.

Next, as shown in FIGS. 3A and 3B an optical pickup device 69 for recording signals on the reproducing the signals from the disc 1 is arranged at one of the rear sides of the player body 3.

As is known, this optical pickup device 69 comprises an objective lens for making it possible to irradiate convergently the recording track in the lower face of the disc 1 with a laser beam, two-axes driving device 71, etc., and can be moved horizontally in the radial direction of the disc 1, i.e. in direction of arrow g through being guided by a pair of parallel guide shafts 72. In other words, the optical pickup device 69 is moved horizontally in the radial direction of the disc 1, i.e. in direction of arrow g along a base line $P_1$ which is inclined at an angle $\theta_1$ of about 45° against the side wall 36b and rear wall 57 of the player body 3.

Accordingly, the pickup device 69 can be held in the corner 73 formed by the side wall 36b and rear wall 57 when the objective lens 70 is underneath the outset position of the recording track, so that it is avoided that the longitudinal length $l_1$ of the player body 3 increases as the corner is not effectively utilized by the optical pickup device 69.

Now, the loading operation of the disc 1 will be described hereinafter.

Firstly as illustrated in FIG. 6A, before the loading operation is performed, the tray carrier 6 is in a state of having been drawn horizontally by a predetermined length $l_2$ in direction of arrow b from the player body 3 through the front opening 4, and the disc tray 5 on the tray carrier 6 is in a state of having been moved downwardly in parallel with the tray carrier 6 along the inclined slots 18, i.e. in direction of arrow i. However, the disc tray 5 is not drawn from the play body 3 completely and the rear part 5a of the disc tray 5 remains in the player body 3 by a length $l_3$.

Before the loading operation is performed, as shown in FIGS. 6A and 10A, the pinion 26 is in a state of engaging at its upper side with the upper portion 19a of the inclined rack 19 and engaging at its lower side with the front portion of the horizontal rack 46. As shown in FIG. 6A, the guide pins 25 are held at the respective upper sides of the inclined slots 18.

As shown in FIG. 7, the spring 43 is in a state of expansion, and the tray carrier 6 is to be restricted in its forward movement, for the rear end supporting block 75 of the horizontal guide shaft 27 abuts against the rear face of the bearing block 34.

Under the aforementioned state, the disc 1 is inserted into the recess 15 of the disc tray 5 and set in a state of being positioned horizontally on the bottom face 15a of the recess 15 as shown with a solid line in FIG. 5A. On this occasion, the disc 1 is locally inserted in direction of arrow j in the player body 3 through the front opening 4 as shown with a phantom line in FIG. 5A and is then turned in the direction of arrow k so as to be inserted horizontally into the recess 15.

After the disc 1 is set horizontally on the disc tray 5, the loading-ejecting switch shown in FIG. 1 is turned to loading. Then the motor 38 rotates in a forward direction and the pinion 40 rotates in the direction of arrow m through the worm gear 39 as shown in FIG. 3A, so that the tray carrier 6 is driven in the direction of arrow a through the horizontal rack 28.

As shown in FIGS. 5B and 6B, the tray carrier 6 is guided by the horizontal guide shaft 27 and horizontal guide rail 35 to be drawn horizontally in direction of arrow a.

While the tray carrier 6 is moved horizontally in the direction of arrow a by a predetermined distance $l_4$ from the position shown in FIG. 6A to the position shown in FIG. 6B, the disc tray 5 is moved upwardly parallel with the tray carrier 6 along the inclined slots 18, in other words, in the direction of arrow n. That is, as the tray carrier 6 moves horizontally in the direction of arrow a, the pinion 26 rolls in the direction of arrow $\theta$ on the fixed horizontal rack 46 and proceeds in the direction of arrow a. Then, the inclined rack 19 is driven in the direction of arrow n due to rotation of the pinion 26 in the direction of arrow 0, and simultaneously the disc tray 5 is pulled in the direction of arrow a by the force of the spring 43 shown in FIG. 7.

Thus, as shown with a solid line in FIG. 6B, the disc tray 5 is moved upwardly in the direction of arrow n in parallel with the tray carrier 6, the guide pins 25 are removed to the respective lower sides 18b of the inclined slots 18, and the pinion 26 is also removed to a position in which the pinion 26 engages at its upper side with the lower portion 19b of the inclined rack 19.

As the tray carrier 6 is further drawn horizontally in the direction of arrow a, the pinion 26 becomes separated from the horizontal rack 46 as shown in FIG. 6B.

According to this parallel displacement of the disc tray 5 in the direction of arrow n, the rear end 5a of the disc tray 5 protrudes, as shown in FIG. 6B, in the direction of arrow a from the rear end 6a of the tray carrier 6 by a predetermined length $l_5$, and the disc tray 5 is lifted up from the surface of the tray carrier 6 by a predetermined height $h_2$ as shown in FIGS. 4A, 5B.

Thus, the disc 1 on the disc tray 5 attains an intermediate height as compared with the turn table 51 and the clamper 54 as shown in FIG. 5B.

Figure 5C:
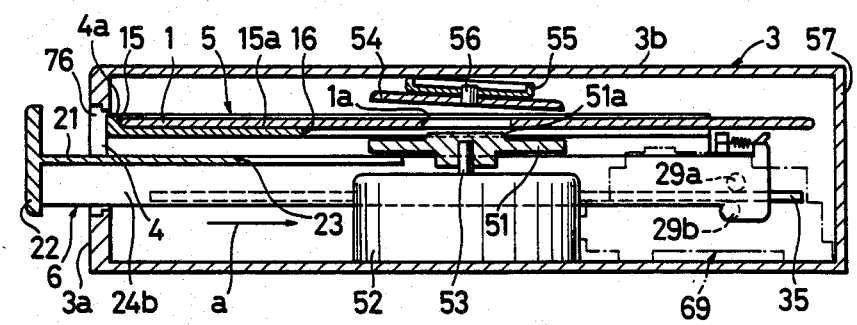

As the tray carrier 6 is drawn horizontally in succession in the direction of arrow a, the disc 1 is drawn horizontally in between the turn table 51 and clamper 54. When the disc 1 is drawn horizontally in the position where a center hole 1a of the disc 1 is in accordance with the center pin 51a of the turn table 51 as shown in FIG. 5c, the rear end 5a of the disc tray 5 abuts against the rear wall 57 of the player body 3 as shown in FIG. 6c and stops.

However, even after the disc tray 5 stops, the tray carrier 6 is drawn horizontally in succession in the direction of arrow a by the length $l_5$ shown in FIG. 6, and stops at the position shown in FIG. 6D.

Thus, as shown in FIG. 6D, the guide pins 25 are removed to the respective upper sides 18a of the inclined slots 18, and thereby, the disc tray 5 descends vertically without rotation in a direction of arrow q.

That is, as the tray carrier 6 is moved in the direction of arrow a, the disc tray 5 is moved relatively in a direction of arrow i in parallel with the tray carrier 6. The result is that the horizontal displacement of the disc tray 5 is offset by that of the tray carrier 6, so that the disc tray 5 descends vertically in the direction of arrow q. The spring 43 shown in FIG. 7 is expanded again.

Figure 5D:
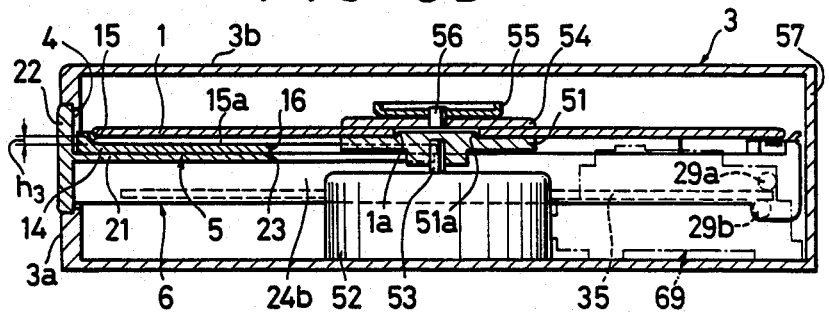

Due to the descent of the disc tray 5 in the direction of arrow q, the disc 1 on the disc tray 5 is moved downwardly, and then mounted horizontally on the turn table 51 as shown in FIGS. 4B and 5D. Thereat, the center hole 1a of the disc 1 engages with the center pin 51a of the turn table 51.

On this occasion, the disc 1 is mounted on the turn table 51, just before the disc tray 5 reaches the lowermost position. Therefore, at the time when the disc tray 5 reaches the lowermost position, the disc 1 is separated from the bottom face 15a of the recess 15 by a predetermined height $h_3$ as shown in FIG. 5D, so that the disc 1 is in a state of being freely rotated.

When the tray carrier 6 is completely drawn into the player body 3, the front opening 4 of the player body 3 is closed by the lid 22 which is provided in the front end of the tray carrier 6 as shown in FIG. 5D.

By the way, while the tray carrier 6 is drawn horizontally in succession in direction of arrow a from the position shown in FIG. 6c by the predetermined length $l_5$ a pin 47 fixed to the tray carrier 6 abuts against the lower end portion 61b of the control plate 61 as shown with a solid line in FIG. 9 and removes this lower end portion 61b in the direction of arrow a to a position shown with a dot-and-dash line in FIG. 9.

Hence, the control plate 61 is rotated in the direction of arrow r against the spring 66, so that the lifting arm 55 is rotated in the direction of arrow d by the force of the spring 59 and the clamper 54 is moved downwardly. Then, the clamper 54 presses down the disc 1 by the force of the spring 59 and fixes the disc 1 on the turn table 51 as shown in FIG. 5D.

Thus, the loading operation of the disc 1 is finished. The motor 38 is stopped by a sensor (not shown) to locate the tray carrier 6 in a position shown in FIG. 6D, where the tray carrier 6 is to be completely drawn in, and the tray carrier 6 is locked in the above position due to a function of the worm gear 39 used as the reduction mechanism as shown in FIG. 3B.

Next, if a reproducing-pause switch 8 shown in FIG. 1 is turned to reproducing, after the loading operation of the disc 1 is over, the motor 52 is driven to rotate the turn table 51, and the disc 1 turns, and the optical pickup device 69 is moved in the radial direction of the disc, i.e. in the direction of arrow g as shown in FIG. 3B.

Then, the disc 1 is read by the laser beam which is radiated from the objective lens 70 and irradiates the recording track on this disc 1 and the desired reproducing is performed.

Now, the ejecting operation of the disc 1 will be described hereinafter.

If the loading-ejecting switch 7 shown in FIG. 1 is turned to ejecting, after the desired reproducing is performed, the motor 38 is driven reversely and the pinion 40 is rotated in the direction of arrow s by this motor 38 through the worm gear 39 as shown in FIG. 3B.

Then, the tray carrier 6 is horizontally drawn out in the direction of arrow b reversely during the loading operation. That is, the ejecting operation is the reversal of the loading operation.

Firstly, while the tray carrier 6 is horizontally drawn out in the direction of arrow b from the position shown in FIG. 6D to the position shown in FIG. 6C by the length $l_5$, the pin 47 of the tray carrier 6 is separated in the direction of the arrow b from the lower end portion 61b of the control plate 61 as shown with the solid line in FIG. 9. Thus, the control plate 61 is rotated in the direction of arrow e by force of the spring 66, the projection 62 pushes up the projection 63, so that the lifting arm is rotated in the direction of arrow d against the spring 59. Therefore, the clamper 54 ascends to the position shwon in FIG. 5C.

For this duration, as shown in FIG. 6C, the disc tray 5 causes a parallel displacement in the direction of arrow 5 by force of the spring 43 shown in FIG. 7, the disc 1 is then set again in the recess 15 of the disc tray 5 as shown in FIG. 5C and lifted upwardly from the turn table 51.

Successively, the tray carrier 6 is drawn horizontally in the direction of arrow b from the position shown in FIG. 6C to the position shwon in FIG. 6A. Then, the disc 1 is carried out by the disc tray 5 stacked on this tray carrier 6.

On this occasion, when the tray carrier 6 is drawn out to the position shown in FIG. 6B, the pinion 26 begins to engage at its lower side with the horizontal rack 46 as shown in FIG. 10B, and while the tray carrier 6 is horizontally drawn in the direction of arrow b from the position shown in FIG. 6B to the position shown in FIG. 6A by the predetermined distance $l_4$, rolling on the horizontal rack 46 in the direction of arrow u as shown in FIGS. 10A, 10B, the pinion 26 proceeds in the direction of arrow b.

Due ot rotation of the pinion 26, the inclined rack 19 is driven in the direction of arrow i in a reversal of the loading operation. Guided by the inclined slots 18 as shown in FIG. 6A, the disc tray 5 finally causes a parallel and slant downward displacement in the direction of arrow i toward the tray carrier 6. The spring 43 shown in FIG. 7 is then expanded again.

Thus, the ejecting operation is finished. The tray carrier 6 is stopped, for the rear end supporting block 75 of the horizontal guide shaft 27 abuts against the bearing block 34 at its rear face as shown in FIG. 7, and the motor 38 is also stopped, for it is detected by a sensor (not shown) that the tray carrier 6 has been fully drawn out.

To sum up, this disc player 2 is so constructed that when the disc 1 on the disc tray 5 is drawn horizontally in the direction of arrow b from the player body 3 through the front opening 4 and ejected as shown in FIG. 5A, the disc tray 5 is moved downward in the direction of arrow i in parallel with the tray carrier 6, just before the tray carrier 6 is fully drawn in the direction of arrow b and stopped as shown in FIG. 6A.

Therefore, when the disc 1 is to be ejected as shown in FIG. 5A, the bottom face 15a of the recess 15 of the disc tray 5, on which the disc 1 is set, is in a state of being lowered enough from the upper edge 4a of the front opening 4 of the player body 3, and the clearance $h_4$ is enlarged fully, so that an angle $\theta_2$ can be made very large. This angle $\theta_2$ is necessary at the time when the disc 1 on the disc tray 5 is turned in the direction of arrow v as shown with the dot-and-dash line in FIG. 5A and then removed upwardly in a slant direction of arrow w. Hence, the operation of setting the disc 1 on the disc tray 5 before its loading, or removing the disc 1 from the disk tray 5 after its ejecting can be performed very easily.

Further, as the disc tray 5 is moved downwardly and at the same time, horizontally in the direction of arrow b, that is, resultantly moved in the direction of arrow i in parallel with the tray carrier 6, it becomes possible to draw the disc tray 5 fully from the player body 3, even though the amount $l_2$ of drawing the tray carrier 6 from the player body 3 is so restrained as to be comparatively small.

As the result, the length $l_6$ from the front face of the tray carrier 6 to the rear face of the disc tray 5 can be made very small, and the longitudinal length $l_1$ of the player body 3 can be successfully shortened by a length of about 13 cm which is nearly equal to the diameter of the disc 1 which is 12 cm.

Now, the second embodiment of the loading-ejecting mechanism of the disc 1 will be described by referring to FIGS. 11A and 11B.

On this occasion, the disc tray 5 is moved upwardly in the direction of arrow n, or downwardly in the direction of arrow i in parallel with the tray carrier 6 by means of a pair of right and left parallel crank mechanisms.

That is, each pair of right and left parallel cranks 78a, 78b pivot rotatably on the respective pins 79a, 79b which protrude from each of the right and left side plates 24a, 24b, and the upper ends of each pair of these parallel cranks 78a, 78b are pivotally mounted on the respective right and left side plates 17a, 17b through the pins 80a, 80b.

Each pair of parallel cranks 78a, 78b are urged rotatably in the direction of arrow x as shown in FIG. 11A by the force of respective springs 83 which are mounted between spring blocks 81 provided in each one of the parallel cranks 78a and spring blocks 82 provided in the right and left side plates 24a, 24b, respectively.

At least one of the above two cranks 78a has integrally formed an arm 84 which projects downwardly from near the pin 79a, and if this arm 84 abuts against a stopper 85 which is disposed in the side plate 24a, the rotation of the crank 78a in the direction of arrow x is restricted as shown in FIG. 11A.

On the occasion of the ejecting operation of the disc 1 previously described, each pair of parallel cranks 78a, 78b have been rotated in the direction of arrow x by the force of the spring 83 as shown in FIG. 11A, when the tray carrier 6 begins to be drawn horizontlaly in the direction of arrow b from the player body 3 through the front opening 4. Therefore, the disc tray 5 is drawn out by the tray carrier 6 such that it is moved upwardly in a slant direction of arrow n in parallel with the tray carrier 6 by the predetermined height $h_2$.

Figure 11B:
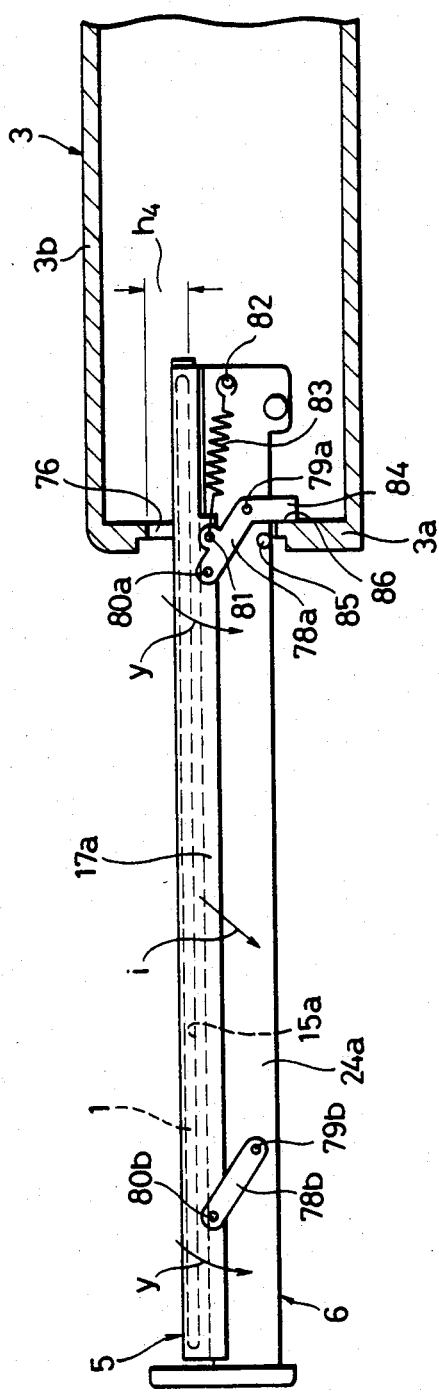

Just before the tray carrier 6 is fully drawn out as illustrated in FIG. 11B, the arm 84 of the parallel crank 78a abuts against the stopper 86 which is mounted in the player body 3, and each of the parallel cranks 78a, 78b rotate in the direction of arrow y as shown in FIG. 11B against the force of the spring 83.

As the result, the disc tray 5 causes a parallel and slant downward displacement in the direction of arrow i toward the tray carrier 6, just before the tray carrier 6 is fully drawn out as shown in FIG. 11B, and thereby, the size $h_4$ of the clearnace 76 previously described is enlarged substantially as illustrated in FIG. 11B.

This invention can be applied not only to the compact disc player but also to various kinds of disc players used for many kinds of audio-discs and video-discs.

The feature of this invention is that when the disc tray is drawn from the player body through the front opening in order to eject the disc, the disc tray is moved downwardly parallel with the tray carrier and the clearance between the top face of the disc tray on which the disc is placed and the upper edge of the front opening of the player body can be enlarged substantially.

Accordingly, even though to make the disc player thinner and smaller in size restrains the disc tray from being drawn from the player body so that the disc cannot be drawn completely from the player body through the front opening and the size of the front opening is restrained, to set the disc on or to remove the disc from the disc tray can be performed very easily due to the much enlarged clearance between the disc on the disc tray and the upper edge of the front opening. This allows making the disc player thinner and smaller in size.

Further, according to this invention, when the disc tray is drawn horizontally from the player body by the tray carrier, the disc tray is moved downwardly in a slant in the direction its being drawn, so that the tray carrier can be drawn enough from the player body, through the amount of drawing the tray carrier from the player body is restrained by a comparatively small amount. Hence, the longitudinal length of the player body in which the tray carrier is horizontally inserted, can be made very small due to the small longitudinal length of the tray carrier.

Having described illustrative embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disc player having a disc tray on which a disc is horizontally placed comprising a player body which has a front opening, a turn table mounted in said player body, a tray carrier mounted in said player body and moveable through the front opening in said player body, and said disc tray moveably mounted on said tray carrier, and mechanical means connected between said tray carrier and said disc tray, so as to cause said disc tray to move downwardly relative to said tray carrier when said disc tray is moved out of said player body through said front opening.

2. A disc player according to claim 1 wherein said mechanical means moves said disc tray in upwardly and downwardly directions parallel to said tray carrier in a slant direction.

3. A disc player according to claim 2, in which said mechanical means comprises a pinion rotatably mounted on said tray carrier, a first rack extending in a slant direction on said disc tray and in mesh with said pinion, and a second rack on said player body and in mesh with said pinion just before said disc tray is drawn fully from said player body through said front opening.

4. A disc player according to claim 2 in which said mechanical means has a spring which urges said disc tray to slide upwardly relative to said tray carrier, such that when said tray carrier is horizontally drawn against the force of said spring into said player body.

5. A disc player according to claim 3; in which said first rack is formed integrally with a side plate of said disc tray.

* * * * *